A. T. LIGHT.
ICE CREAM FREEZER.
APPLICATION FILED JAN. 25, 1921.
1,430,572.
Patented Oct. 3, 1922.
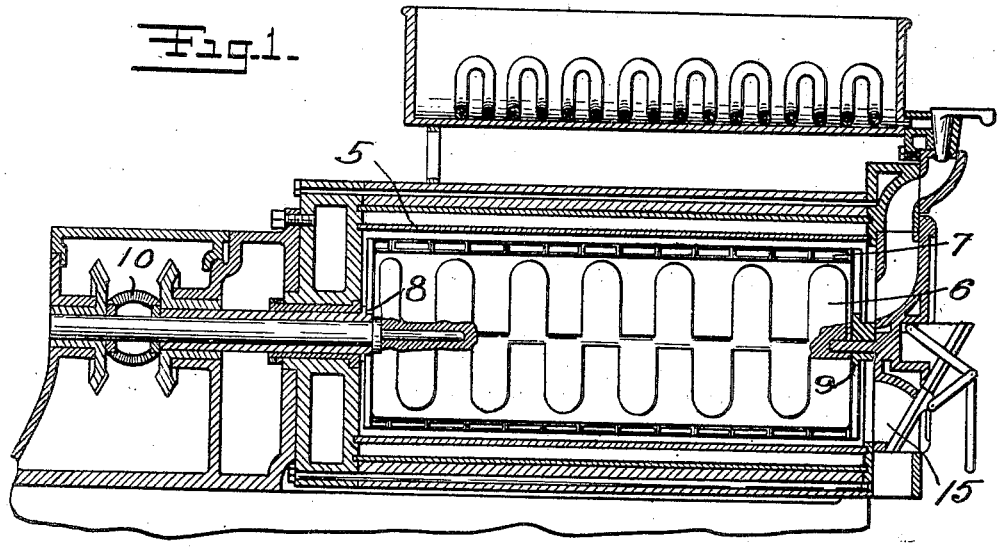
Fig.1.
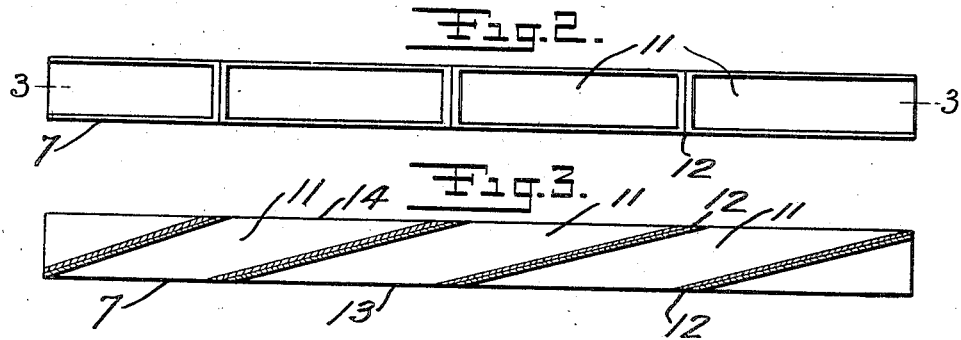
Fig.2.
Fig.3.
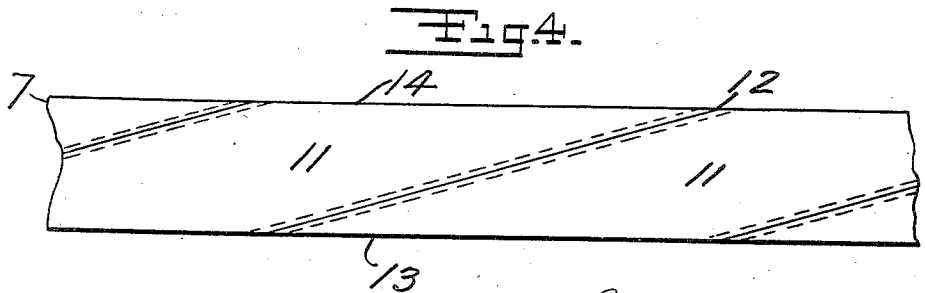
Fig.4.
Albert T. Light, Inventor
By his Attorney
Frank J. Kent Patented Oct. 3, 1922.

1,430,572

UNITED STATES PATENT OFFICE.

ALBERT T. LIGHT, OF NEW YORK, N. Y.

ICE-CREAM FREEZER.

Application filed January 25, 1921. Serial No. 439,813.

*To all whom it may concern:*

Be it known that I, ALBERT T. LIGHT, a subject of the King of Great Britain and Ireland, residing at New York, in the county of Bronx and State of New York, have invented certain new and useful Improvements in Ice-Cream Freezers, of which the following is a specification.

My invention relates particularly to freezers of the larger, commercial sizes and has for its object to improve the mixing and beating action of such freezers.

The invention consists in part of a special form of beater constructed so as in its beating operation, to propel the mixture longitudinally of the containing vessel.

Other novel features of the invention will appear as the specification proceeds.

In the accompanying drawing, wherein I have illustrated but one of the practical embodiments of the invention, Figure 1 is a vertical sectional view of a well-known type of freezer having my invention incorporated therein; Figure 2 is an enlarged front or edge view of a section of one of the beater bars or blades; Figure 3 is a longitudinal sectional view thereof on substantially the plane of line 3—3 of Figure 2; Figure 4 is a top plan view of the bar shown in Figure 2 on a somewhat larger scale.

The freezer shown comprises a suitably refrigerated cream can or containing vessel 5, within which operate a paddle 6 and beater blades 7. The blades 7 are supported and carried by suitable hub structures 8 and 9. The beater blades and paddle are rotated in reverse directions by the gearing 10.

The beater blades 7 are of novel construction, in that they are each made up of sections of tubing 11, disposed side by side, but inclined to the longitudinal axis of the blade. Square tubing is shown as used in the present disclosure and the sections are shown secured together in flat engagement by continuous brazed or welded joints, indicated at 12. At their ends, the sections are cut off on an incline to the axes of the sections, but on common planes forming the relatively straight front and rear edges 13 and 14 of the bar.

This provides a bar or blade having a large number of passages or channels therethrough which, as shown, extend in the general plane of the movement of the blade, but are inclined relative to the longitudinal axis of the blade. The inclination of the channels preferably is such that the opposite ends of each channel are offset to such an extent as to prevent the material flowing directly through the channel—in other words, the material is forced to follow the inclination of the walls which define the channel.

The operation of this form of beater blade breaks up the material into a number of relatively fine streams and propels the material passing therethrough longitudinally or toward the end of the can. This breaking-up and endwise movement of the material produces a thorough mixing and facilitates the freezing operation. The forcing of the material through the passages also has a compacting or condensing effect on the material, which aids in the proper freezing of the product.

The beater blades are preferably disposed close to the inner wall of the can, so as to operate as scrapers. This scraping action is made easier by reason of the breaking of the material up in a number of streams and the leading edges of the partitions which define the several passages act as cutters to assist in breaking the frozen material away from the inner wall of the can.

While I have illustrated and described a practical and, at the present time, a preferred embodiment of my invention, I would have it understood that various changes and modifications may be made without departure from the true spirit and scope of the invention. For instance, I have in mind that the inclination and arrangement of the passages may be varied to suit different requirements.

Thus the passages of one of the beater bars may be inclined in a reverse direction from the passages of the other beater bar, so that one bar will propel the mixture toward one end of the can while the other bar will propel the mixture toward the opposite end of the can. Usually, however, the passages in both bars will be inclined in one direction and arranged so as to propel the mixture toward the discharge end of the can, the discharge outlet being indicated at 15 in the illustration. As another possibility, the passages may be inclined from an intermediate portion of the bar toward the opposite ends thereof, which would have the effect of propelling the mixture from the central portion toward the opposite ends of the can.

Also, other shaped tubing than the angular form shown may be used. The square or angular form, however, appears to be preferable, because of its inherent strength and because of the fact that it provides flat sides which can be readily secured together.

I claim:

1. A beater blade made up of sections of square tubing secured side by side and inclined to the longitudinal axis of the blade.

2. A beater blade made up of sections of square tubing secured side by side and inclined to the longitudinal axis of the blade, said sections having their ends cut on common planes inclined to the axes of the tubes to form the opposite edges of the blade.

3. A beater blade made up of sections of tubing secured together in side by side relation and inclined to the longitudinal axis of the blade.

4. A beater blade having sections of tubing incorporated therein and extending through from one edge to the opposite edge of the blade and inclined with respect to the longitudinal axis of the blade.

In testimony whereof I affix my signature.

ALBERT T. LIGHT.